READ AMPLIFIER BASELINE STABILIZATION

Filed April 16, 1964

INVENTOR
HAJIME YOSHII
BY Stuart Lubitz
ATTORNEY

INVENTOR
HAJIME YOSHII

BY Stuart Lubitz

ATTORNEY

INVENTOR
HAJIME YOSHII
BY Stuart Lubitz
ATTORNEY

Aug. 22, 1967 HAJIME YOSHII 3,337,859

READ AMPLIFIER BASELINE STABILIZATION

Filed April 16, 1964 4 Sheets-Sheet 4

INVENTOR
HAJIME YOSHII
BY Stuart Lubitz
ATTORNEY

United States Patent Office 3,337,859

Patented Aug. 22, 1967

3,337,859

READ AMPLIFIER BASELINE STABILIZATION

Hajime Yoshii, Morgan Hill, Calif., assignor to Ampex Corporation, Redwood City, Calif., a corporation of California Filed Apr. 16, 1964, Ser. No. 360,288
8 Claims. (Cl. 340—174.1)

This invention relates to means for stabilizing write currents for an A.C. coupled amplifier of the type which finds utility as a read amplifier in magnetic recording systems.

The baseline of a typical alternating current amplifier will normally shift over a period of time if the input signal applied thereto is asymmetric to a great degree. Such baseline shifting results principally from capacitance buildup and is usually undesirable because in order for the circuits connected to the amplifier output to tolerate such shifting, they must generally be more complex and expensive.

U.S. patent application Ser. No. 355,260 filed on Mar. 27, 1964 and assigned to the same assignee as the present application, discloses a magnetic recording and verifying system in which an alternating current amplifier is coupled to a magnetic head read winding. In the system disclosed in the cited patent application, a different magnetic head is provided for each track on a magnetic recording medium, each head functioning to both write and read. Inasmuch as the preferred embodiment of the disclosed system employs a return-to-bias (RB) method of recording, current is always applied to the write winding in the same direction; e.g. current is applied only to write binary "1" digits, no current being necessary to record binary "0" digits. Since the read and write windings are coupled to the same magnetic head, a current is induced in the read winding by transformer action each time a "1" digit is written and as a consequence the read amplifier baseline is shifted. In view of the baseline shifting, a relatively expensive detector circuit must be provided to sense the signal induced in the read winding by the recorded signal. Considerable cost savings in the detector circuit can be realized by eliminating the base line shifting.

Consequently, it is an object of the present invention to provide apparatus for use in conjunction with an amplifier for stabilizing the amplifier baseline.

It is a more particular object of the present invention to provide a magnetic recording and verifying system which utilizes a single head for reading and writing and yet which avoids shifting the baseline of an alternating current amplifier coupled to the read head winding.

In accordance with the invention, the read amplifier baseline is stabilized by shaping the current pulse applied to the write winding of the common head to provide symmetric recovery in the read winding output.

In a preferred embodiment of the invention, circuit means are connected between the write amplifier and the write winding which circuit means functions to cause the write current pulse to terminate in a heavily damped oscillatory signal. By transformer action, this oscillatory signal is induced in the read winding to which the read amplifier is connected. The average value of the oscillatory signal is of course zero and consequently there is no substantial capacitance buildup and no accompanying baseline shift. Moreover, the oscillatory signal induced in the read winding by transformer action can be easily separated from a signal induced in the winding by reading from the magnetic medium, by a low pass filter which only passes the latter signal. In addition, the oscillatory read signal is sensed when the read enable is down, thus the oscillatory signals are never effectively detected by detector means (not shown).

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 3:
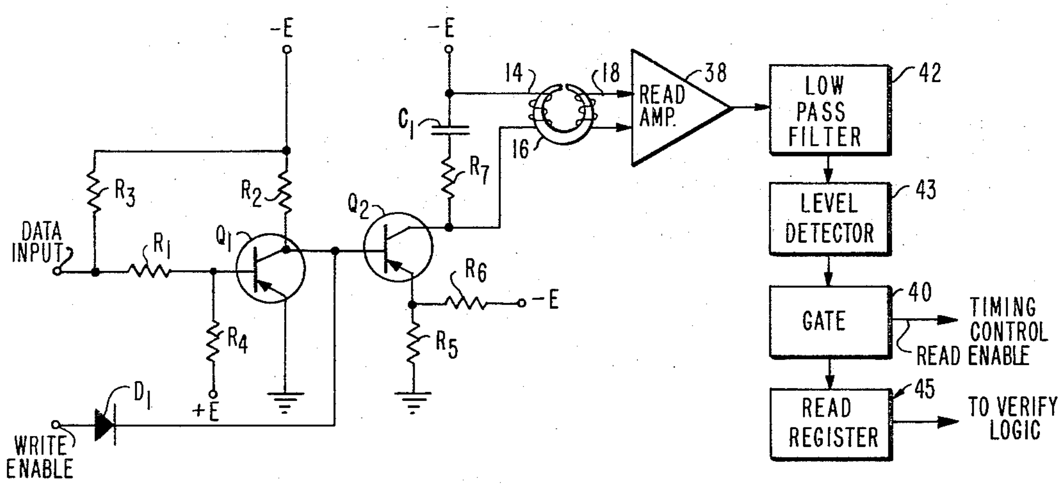
FIGURE 3 is a schematic and block diagram illustrating how the write means and read means of the system of FIGURE 1 can be constructed to incorporate the present invention.
Figure 5:
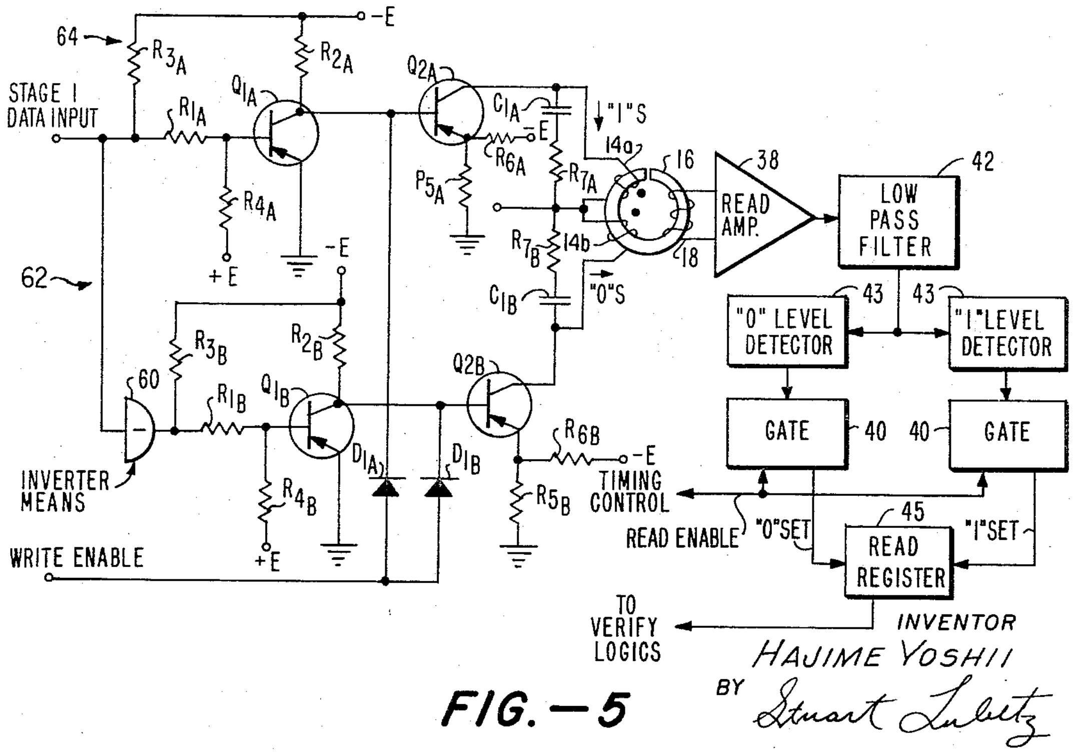
Figure 4:
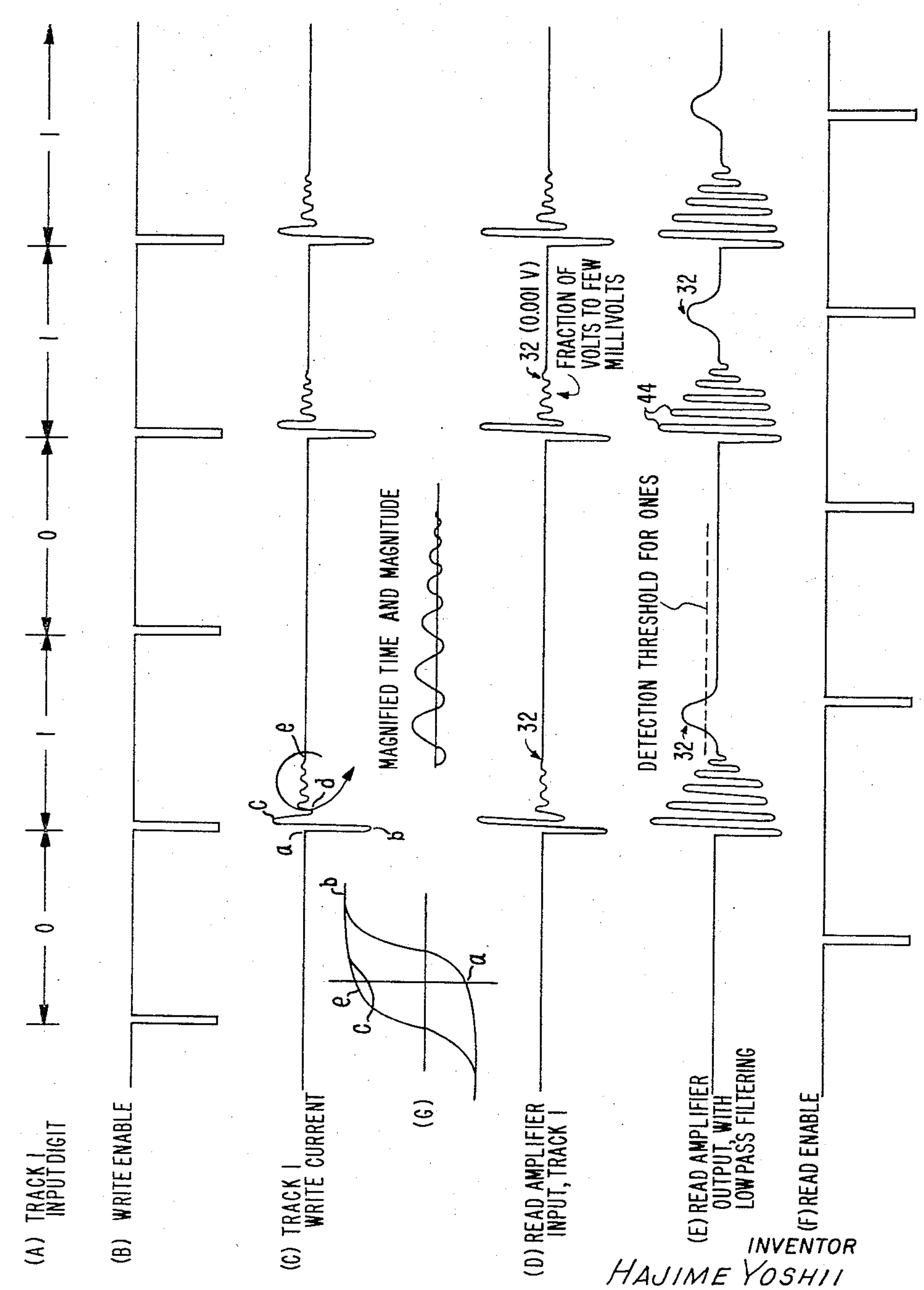
Figure 6:
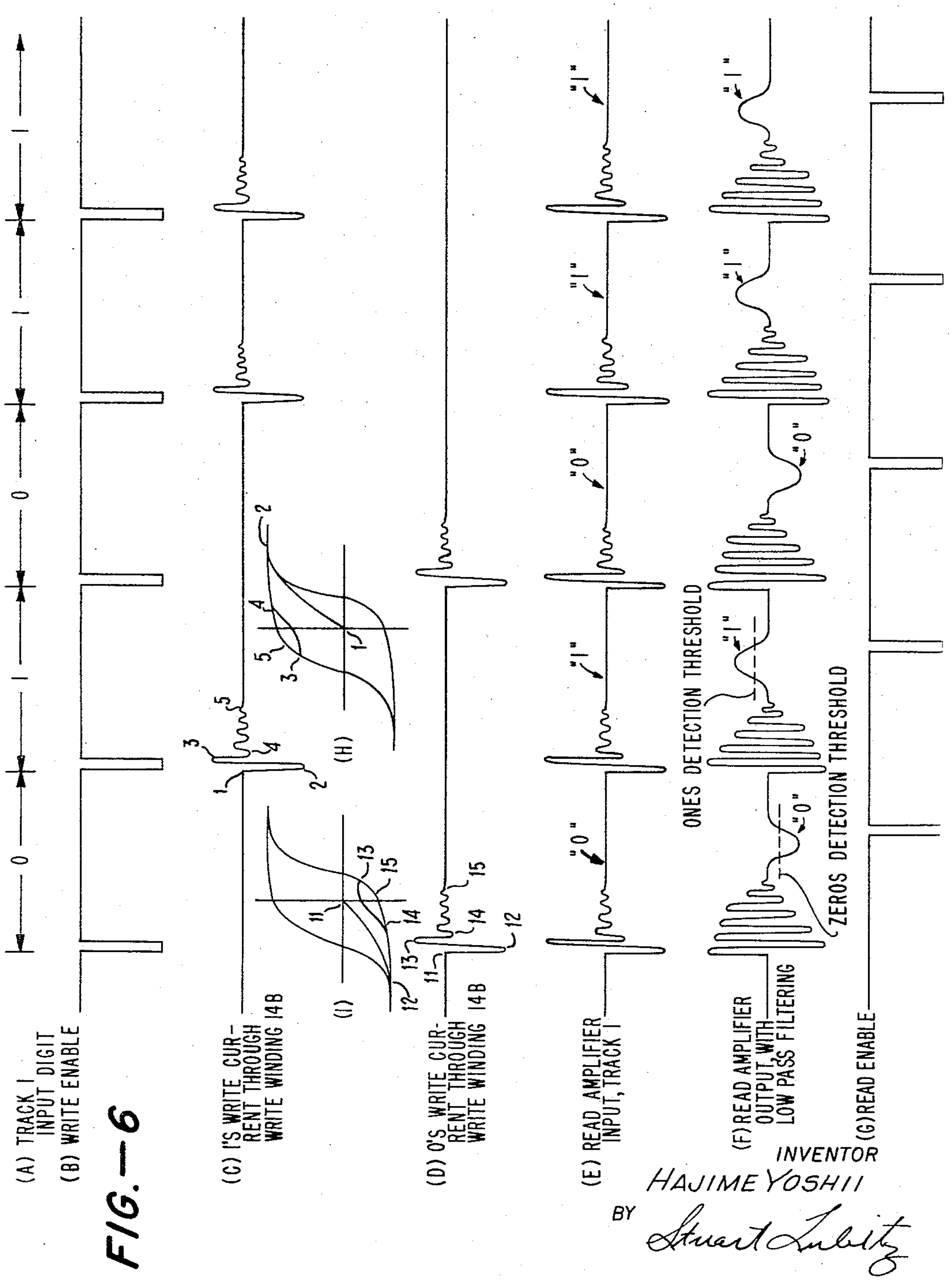

FIGURES 4(*a*) through (*f*) is a waveform chart illustrating waveforms appearing at various points in the apparatus of FIGURE 3;

FIGURE 4(*g*) is an illustration of a hysteresis loop tending to illustrate the effect on the magnetic flux on a recording medium in response to writing by the apparatus of FIGURE 3;

FIGURE 5 is an alternate embodiment of the invention;

FIGURE 6(a) through (*g*) is a waveform chart illustrating waveforms appearing at various points in the apparatus of FIGURE 5; and FIGURES 6(*h*) and 6(*i*) are illustrations of a hysteresis loop showing the effect on the magnetic flux of a recording medium in response to writing by the apparatus of FIGURE 5.

Figure 1:
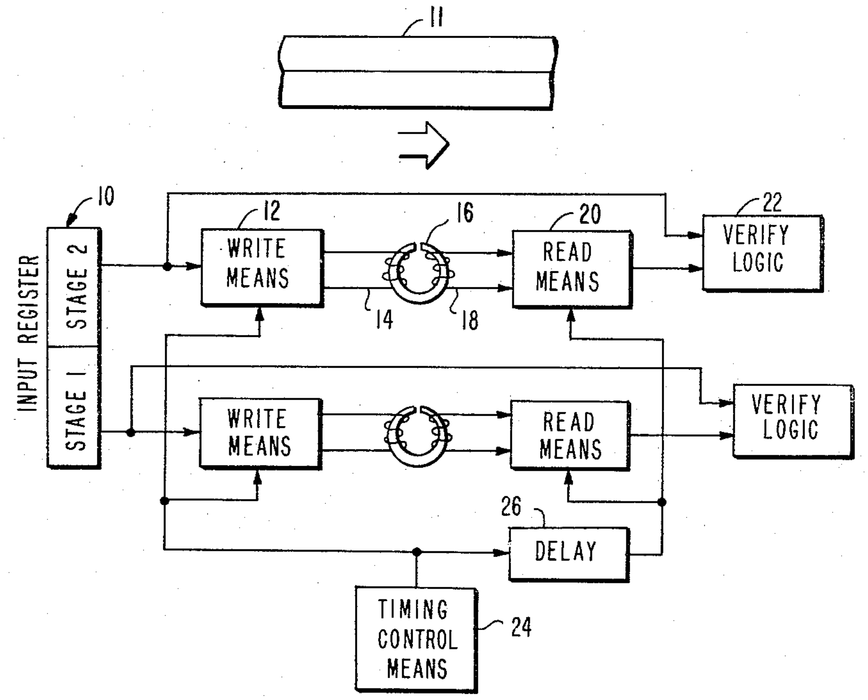
FIGURE 1 is a block diagram of a magnetic recording and verifying system in which the teachings of the present invention can be advantageously incorporated.

Attention is now called to FIGURE 1 which comprises a block diagram of a magnetic recording and verifying system of the type specifically discussed in the aforecited U.S. patent application. Briefly, the system includes a multistage input register 10, herein having two stages, adapted to store information to be written on a magnetic medium 11. Each stage of the input register 10 is connected to a write means 12 which in turn is connected to a write winding 14 coupled to a magnetic head 16. A read winding 18 is also coupled to the head 16 and a read means 20 is connected to the read winding. The output of the read means 20 is connected to the input of a verify logic circuit 22 along with the output of the corresponding stage of the input register.

A timing control means 24 is provided whose output terminal is connected directly to the control input terminals of each of the write means 12. The timing control means output terminal is in addition connected through a delay circuit 26 to the control input terminals of each of the read means 20.

In the operation of the system of FIGURE 1, information to be recorded is entered into the input register 10. In response to the provision of a timing signal by the timing control means 24, the write means 12 provides an appropriate signal to the write winding 14 connected thereto to record information on the magnetic medium 11. After a short delay introduced by delay circuit 26, the read means 20 coupled a signal induced by the signal recorded on the magnetic medium, to a read register (not shown) and then to the verify logic 22 which compares the read signal with the output of the corresponding stage of the input register. If the two signals applied to the verify logic circuit 22 match, then it is clear that the information actually recorded on the medium is that intended to be recorded.

Although a two-track recording and verifying system is illustrated in FIGURE 1, it should be apparent that a similar system having virtually any number of tracks could be provided.

In the aforecited patent application, a preferred embodiment of the system illustrated in FIGURE 1 is disclosed which uses a return-to-bias (RB) recording method in which the flux on the magnetic medium is initially biased in a first direction and the write means 12 responds to binary "1" input digits to reverse the biased flux orientation. The flux orientation is left in its biased condition in response to binary "0" input digits. The utilization of such a recording method has certain clear advantages over other methods but however it also introduces a problem with respect to shifting of the read amplifier baseline.

Figure 2:
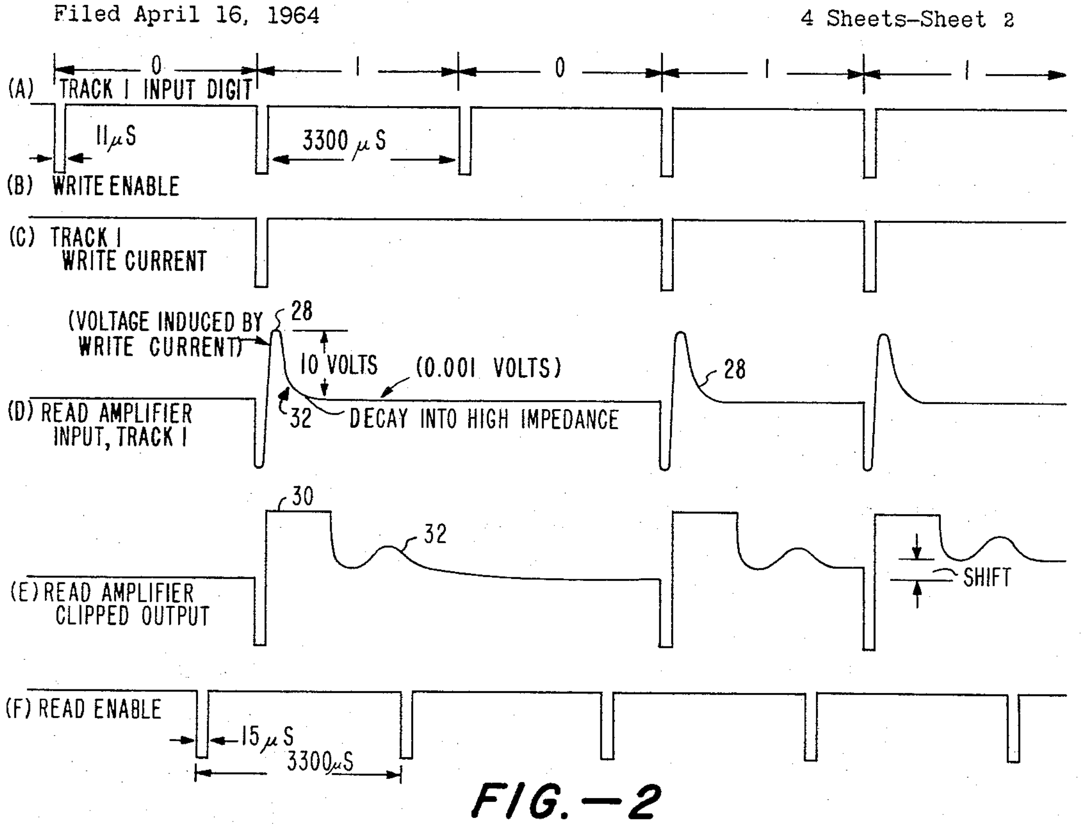
FIGURE 2 is a waveform chart illustrating various waveforms developed in the system of FIGURE 1 when the present invention is not incorporated therein, the waveforms tending to illustrate that the baseline of a read amplifier in such a system will shift.

In order to gain a better understanding of the problem of baseline shifting, attention is called to the waveform chart of FIGURE 2 which in line (*a*) thereof illustrates an arbitrarily chosen series of binary digits which are successively entered into one stage of the input register by some external device which is not here illustrated. Line (*b*) of FIGURE 2 illustrates the write enable pulses which are applied to the write means by the timing control means 24 during each successive digit period.

As indicated, a write current is developed in the write winding 14 in response to the generation of a write enable pulse only when a binary "1" digit is stored in the corresponding stage of the input register in accordance with the RB method of recording. Note that the write current in line (*c*) of FIGURE 2, by transformer action, induces a signal in the read winding 18 which has a slowly decaying recovery component 28. The component 28 is due to high impedance desired in the write means 12 for minimum noise when the write enable line is up or energized. If the write means 12 has a low impedance with write enable line up, any noise on the power supply will cause a substantial reduction in the signal-to-noise ratio in the read means 20. This is because the read winding 16 shares a common magnetic circuit with the write winding 18 in the head 16. In a typical situation, the signal induced in the read winding 18 by transformer action is approximately four orders of magnitude larger than the signal subsequently induced in the read winding in reading the recorded signal from the magnetic medium. Consequently, the read means 20 must include an amplifier which provides a very substantial gain in order to detect whether or not a signal 32 is in fact induced in the read winding by the magnetic medium. It of course should be appreciated that in accordance with the RB recording method, only if a binary "1" digit is recorded, will a signal 32 be induced in the read winding 18. The output of the read amplifier incorporated in read means 20 preferably severely clips the amplitude of the signal 30 induced in the winding 18 by transformer action and provides linear amplification of signal 32. The output of the clipped and amplified signal derived from the winding 18 is illustrated in line (*e*) of FIGURE 2 in which signal portion 30 represents the signal induced by transformer action and signal 32 represents the signal induced by the recording on the magnetic medium. Line (*f*) of FIGURE 2 illustrates a series of read enable pulses which are developed in each successive digit period after the delay introduced by the delay circuit 26. The read enable pulses control a gate circuit in the read means 20 so that the provision of a signal 32 by the read means 20 concurrent with the generation of a read enable pulse, indicates that a binary "1" digit is recorded.

It is here pointed out that although in line (*e*) of FIGURE 2, no output signal from the read amplifier is illustrated in those digit periods during which a binary "0" digit is recorded, actually, because of inter-track crosstalk in a multitrack recorder system, a signal portion 30 would appear at the read amplifier output during each digit period. The signal portion 32 distinguishes periods during which a binary "1" digit is recorded from those digit periods in which a binary "0" digit is recorded.

It should be apparent from FIGURE 2 that the signal applied to the read amplifier in the read means 20 is asymmetric to a great degree, the asymmetry being caused mostly by the slowly decaying component 28 which when amplified extends over a reasonably long duration. The cumulative effect of the asymmetry of the signal in the read amplifier, shifts the amplifier baseline so that a circuit provided to detect the signal 32 read from the magnetic medium must be reasonably complex and expensive in order to tolerate input level variations. In accordance with the invention, the input signal applied to the read amplifier is shaped so as to be substantially symmetric to thereby avoid shifting the amplifier baseline. Symmetry is introduced by providing circuit means for converting the slowly decaying component 28 into an oscillatory signal.

Attention is now called to FIGURE 3 which illustrates how a write means can be constructed to include circuit means for developing an oscillatory signal to stabilize the read amplifier baseline. The write means of FIGURE 3 includes a two-stage amplifier comprising transistors Q1 and Q2. The base of transistor Q1 is connected through a resistor R1 to a data input terminal. The collector of transistor Q1 and the input terminal are respectively connected through resistor R2 and R3 to a source of negative potential. The base of transistor Q1 is connected through a resistor R4 to a source of positive potential and the emitter of transistor Q1 is grounded. The collector of transistor Q1 is connected to the base of transistor Q2 and to the cathode of a diode D1 whose anode is connected to a write enable input terminal. The emitter of transistor Q2 is connected through resistor R5 to ground and through resistor R6 to a source of negative potential. The collector of transistor Q2 is connected to a first terminal of a write winding 14 whose second terminal is connected to a source of negative potential. Connected in parallel with the write winding 14 is a series branch including a capacitor C1 and a resistor R7.

In the operation of the write means of FIGURE 3, when a zero volt signal, representative of a binary "1" digit, is applied to the input terminal, transistor Q1 will be held off. So long as the signal applied to the write enable terminal is at 0 volts, the base of transistor Q2 will be held at approximately ground potential and consequently transistor Q2 will be held off by the R5 and R6 bias network. The cutoff collector of transistor Q2 has a substantially high impedance, with write enable up. This does not permit significant coupling of any noise on the source of negative potential into the write winding 14 and then into read winding 18 by transformer action. When the potential applied to the write enable terminal falls to −E however, transistor Q2 will be turned on to initiate current flow in the series branch including the capacitor C1. The transistor Q2 will remain on of course, only so long as the signal applied to the write enable terminal is at −E volts. When transistor Q2 cuts off, the capacitor C1 will discharge and an oscillatory signal will be set up in write winding 14. As a consequence of resistor R7, the oscillatory signal will be heavily damped as shown in line (*c*) of FIGURE 4. Line (*d*) of FIGURE 4 illustrates the signal provided at the output of the read amplifier 38 connected to the read winding 18. Since the signal applied to the read amplifier is substantially symmetric, the capacitance buildup which would otherwise occur therein is minimized so as to stabilize the amplifier baseline.

When a "0" input digit, i.e. −E volts potential is applied to the input terminal transistor Q1 will turn on and consequently its collector will reside at substantially ground potential regardless of what potential is applied to the write enable terminal. Thus, transistor Q2 will be held off.

Although the write current developed in the winding 14 is oscillatory, because it is heavily damped, it still has the effect of switching the flux on the magnetic medium. In order to better understand this, attention is called to the hysteresis loop shown in FIGURE 4(*g*). Assume that the flux is initially at point *a* to represent the biased flux or "0" condition. The initial current in the write winding 14 will switch the flux to point *b* on the hysteresis loop and as the heavily damped current oscillates, the flux will move to point *c* and then to point *d* and so forth thereby defining smaller and smaller loops ultimately coming to rest at point *e* representing an opposite residual flux condition than was represented by the bias condition at point *a*. The point *e* of course defines a "1" remanent flux which forms "1" signal 32 when the medium is moved with respect to the head.

The gate 40 to which the read enable signal is applied by the timing control means 24 is adequate to separate the signal 32 read from the magnetic medium from the signal induced in the winding 18 by transformer action. The connection of a low pass filter 42 to the output of the read amplifier 38 functions to attenuate the oscillations 44 shown in line (*e*) of FIGURE 4 and further assure proper operation. The signal 32 can then be easily detected by a simple level detector 43 using a single detection threshold and selected time wise by a gate 40 when the read enable line is down. The gate 40 transfers the detected data into read register 45 for binary comparison in the verify logic circuits 22.

From the foregoing, it should be apparent that apparatus has been disclosed herein for stabilizing the baseline of an amplifier which can be used as a read amplifier in a magnetic recording system and more particularly in a magnetic recording and vertifying system. Essentially, stabilization is accomplished by converting an asymmetric input signal to a substantially symmetric input signal by developing a heavily damped oscillatory signal in response to the asymmetric input signal.

An alternative embodiment useful in a system employing return-to-zero coding is shown in FIGURE 5. This system utilizes two write amplifiers so that "0" and "1" write currents are bipolar and differentially opposed in the write winding 14. Referring to FIGURES 5 and 6, an inverter means 60 inverts the input data. The inverted signal is applied to "0's" write amplifier 62 while the input data is applied directly to "1's" write amplifier 64. Otherwise the two write amplifiers are identical to the write amplifier in the preferred embodiment, FIGURE 3. When a zero volt signal representative of a "1" digit is applied to the data input terminal the winding **14*a* will be energized by the write enable signal. The amplifier 62 will be biased to maintain the winding 14*b* in an effectively de-energized condition. The inverter means 60 causes the reversed result when a voltage representing a "0" digit is supplied to the data input terminal. The resulting write currents are opposed in polarity at the write windings 14*a* and 14*b***.

In the RZ mode of recording disclosed in U.S. patent application 355,260, the tape is AC erased hence the flux transitions start at points 1 or 11 in FIGURE 6 of the present application, and the flux transits to remanent fluxes at point 5 for "1's", and to remanent flux at point 15 for "0's." Again the damped oscillatory write currents do not affect the remanent flux positions when compared with uncompensated (now oscillatory) bipolar write currents.

The remanent fluxes at either points 5 or 15 is read by winding 18 as in the preferred embodiment, when the medium is moved with respect to the head. In the RZ mode, the "1's" and "0's" signals are one-half amplitudes of the RB "1's" signals. Note that "0's" signals are applied to level detector 43, set to "0's" DETECTION THRESHOLD, and "1's" signals are applied to a separate level detector 43, set to "1's" DETECTION THRESHOLD. At an appropriate time, the read enable goes down to transfer data from the level detectors 43 into the read register 45, thus providing an input for the vertify logic 22.

What is claimed is:

1. In a magnetic recording system including a magnetic head having a read and a write winding coupled thereto, a read amplifier connected to said read winding, a source of input information, a write amplifier connected to said source and responsive to information provided thereby for providing an output signal having an asymmetric recovery component, and circuit means connecting said write amplifier to said write winding and responsive to said asymmetric recovery component for applying a substantially symmetric signal to said write winding.

2. The system of claim 1 wherein said circuit means includes means operable with said write winding and responsive to said asymmetric recovery component for developing an oscillating signal in said write winding.

3. The system of claim 2 wherein said circuit means includes a capacitor connected in a path connected in parallel with said write winding.

4. The system of claim 2 including a low pass filter connected to the output of said read amplifier.

5. In a magnetic recording system including a magnetic head having both a read winding and a write winding coupled thereto, a read amplifier connected to said read winding, a write amplifier; circuit means connecting said write amplifier to said write winding and responsive to an asymmetric output signal provided by said write amplifier for applying a substantially symmetric damped oscillatory signal to said write winding.

6. In a magnetic recording and verifying system in which a single magnetic head having a read winding and a write winding coupled thereto is employed to write binary information on and then immediately read said information from a magnetic recording medium; a source of successive binary digit manifestations comprised of "1" and "0" digit manifestations; a write amplifier responsive to said "1" digit manifestations for developing a unipolar output pulse; circuit means connecting said write amplifier to said write winding and responsive to said unipolar output pulse for developing a damped oscillatory signal in said write winding; and a read amplifier connected to said read winding.

7. The system of claim 6 wherein said circuit means for developing said damped oscillatory signal comprises a circuit branch including a resistance and capacitance connected in parallel with said write winding.

8. The system of claim 6 including a low pass filter connected to the output of said read amplifier.

References Cited

UNITED STATES PATENTS

| | | | |
|---|---|---|---|
| 2,976,517 | 3/1961 | Fuller et al. | 340—174.1 |
| 3,072,893 | 1/1963 | Fuller | 340—174.1 |
| 3,252,098 | 5/1966 | Schlaepfer | 340—174.1 |
| 3,252,099 | 5/1966 | Dodd | 340—174.1 |

BERNARD KONICK, *Primary Examiner.*

A. I. NEUSTADT, *Assistant Examiner.*